United States Patent [19]

Lampe

[11] Patent Number: 5,179,831
[45] Date of Patent: Jan. 19, 1993

[54] STORED ENERGY SYSTEM FOR DRIVING A TURBINE WHEEL

[75] Inventor: Steven Lampe, San Diego, Calif.

[73] Assignee: Sundstrand Corporation, Rockford, Ill.

[21] Appl. No.: 561,093

[22] Filed: Jul. 31, 1990

[51] Int. Cl.[5] .................. F23R 3/26; F02C 7/27
[52] U.S. Cl. .................. 60/39.142; 60/39.230; 60/727
[58] Field of Search .......... 60/727, 39.142, 39.29, 60/39.23, 39.27, 39.141, 39.06

[56] References Cited

U.S. PATENT DOCUMENTS

| | | |
|---|---|---|
| 2,463,964 | 3/1949 | Graf . |
| 2,611,239 | 9/1952 | Briggs ............... 60/39.27 |
| 2,742,757 | 4/1956 | Jaquith ............... 60/727 |
| 2,742,758 | 4/1956 | Kelly ............... 60/39.141 |
| 2,858,672 | 11/1958 | Clark ............... 60/39.141 |
| 2,976,682 | 3/1961 | Erickson . |
| 3,098,626 | 7/1963 | Messinger ............... 60/39.142 |
| 3,704,586 | 12/1972 | Bruns . |
| 4,043,120 | 8/1977 | Hoffeins . |
| 4,161,102 | 7/1979 | Jasas et al. . |
| 4,237,692 | 12/1980 | Ahrens et al. ............... 60/727 |
| 4,312,179 | 1/1982 | Zaugg . |
| 4,445,532 | 5/1984 | Mitchell ............... 60/39.142 |
| 4,685,287 | 8/1987 | Takuma . |
| 4,693,073 | 9/1987 | Blackburn . |
| 4,712,371 | 12/1987 | Weber . |
| 4,777,793 | 10/1988 | Weigand et al. ............... 60/39.142 |
| 4,819,423 | 4/1989 | Vershure, Jr. et al. ............... 60/39.02 |
| 4,897,994 | 2/1990 | Shekleton ............... 60/39.06 |

Primary Examiner—Richard A. Bertsch
Assistant Examiner—Timothy S. Thorpe
Attorney, Agent, or Firm—Wood, Phillips, Mason, Recktenwald & VanSanten

[57] ABSTRACT

Improved control over the production of motive gas applied by a nozzle (16) to a turbine wheel (10) may be achieved by a method of (a) supplying fuel to a combustor (20), (b) simultaneously with the performance of step (a), supply insufficient oxidant for the fuel through a path (90) to the combustor (20), and (c) simultaneously with steps (a) and (b), supplying additional oxidant sufficient to effect desired combusiton of the fuel to the combustor (20) via a path (92) and at a variable rate.

5 Claims, 1 Drawing Sheet

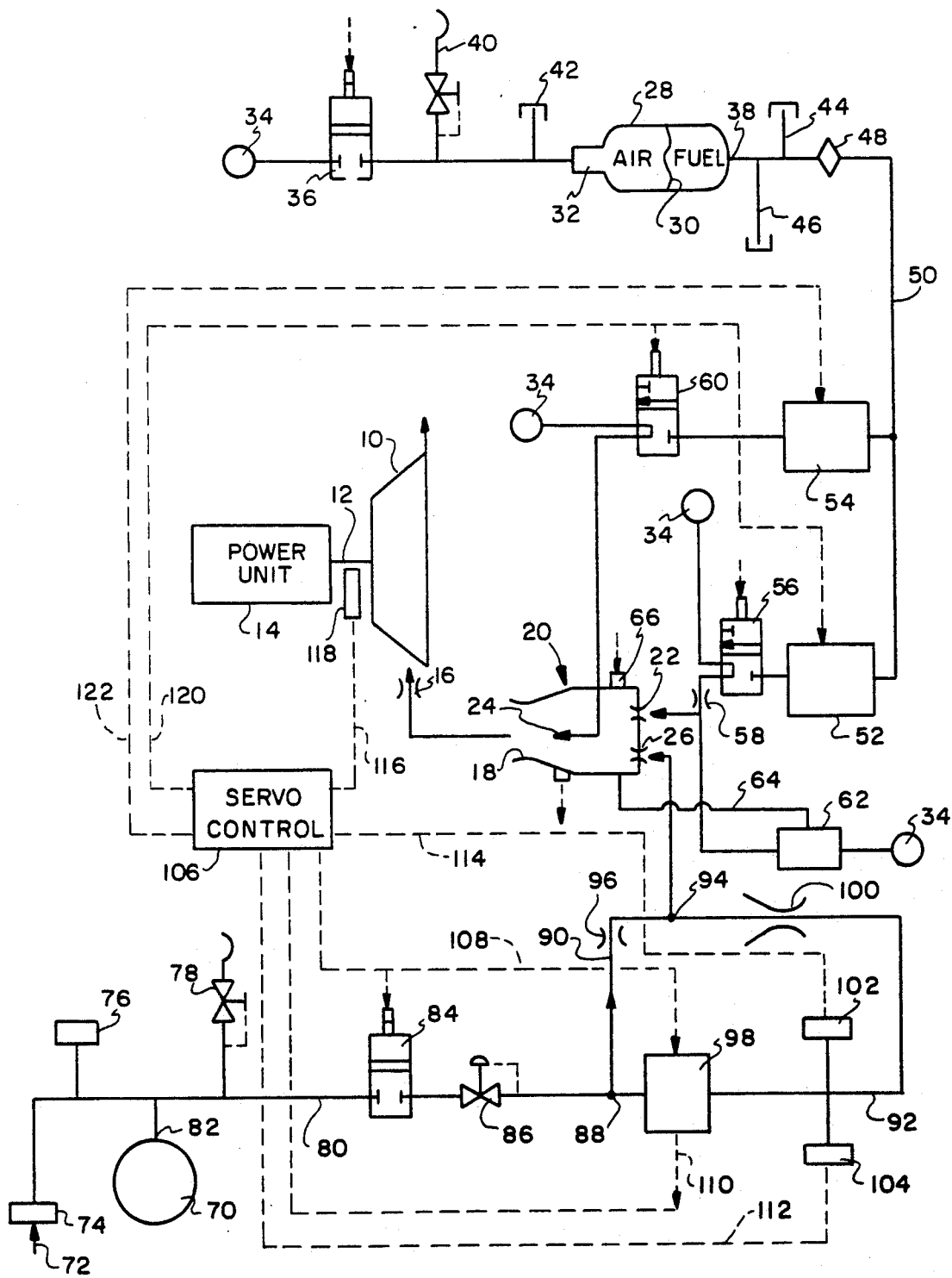

STORED ENERGY SYSTEM FOR DRIVING A TURBINE WHEEL

FIELD OF THE INVENTION

This invention relates to so-called stored energy systems wherein stored fuel and oxidant are combusted to provide motive gases to drive a turbine wheel as in starting or operating an auxiliary power unit or an emergency power unit.

BACKGROUND OF THE INVENTION

Both commercial and miliary aircraft typically carry auxiliary power units (APU) and often additionally may utilize a so-called emergency power unit (EPU) In some instances, the functions of both are combined.

In emergency systems, EPUs, or APUs that operate additionally as EPUs must be brought into full operational capacity in a relatively short period of time, such as two or three seconds. In the usual case, these systems employ a turbine wheel for driving emergency power sources such as an electrical generator, hydraulic pump or both so as to provide the energy necessary to continue to operate the aircraft. Consequently, it is necessary that the turbine wheel be accelerated up to normal operating speed in a relatively short period of time so that if an APU is being utilized to provide emergency power, it can reach a self sustaining speed. Where an EPU is being utilized, it still must be accelerated rapidly and then its operation maintained for some predetermined time period.

Typically, these systems include a storage source for fuel and a high pressure storage vessel for oxidant which is utilized to combust the fuel. The oxidant may be air, oxygen enriched air, or even molecular oxygen.

Because of volume and weight constraints typically associated with aircraft, it is desirable to make the storage vessels as small and as lightweight as possible and that in turn means that it is desirable to hold oxidant requirements for a given emergency operation to a minimum. One way, of course, to minimize oxidant consumption, and thus the need for oxygen storage volume, is to control the flow of oxidant to a combustor where it is employed to combust fuel to provide motive gases for the turbine wheel, so as to provide only the amount of oxidant required to effect the desired combustion Consequently, in an EPU, for example, it will be desirable to sense the power demand of the aircraft which is being placed on the turbine wheel of the EPU and regulate the flow of both fuel and oxidant appropriately.

This invention is intended to provide a means whereby improved flow control of oxidant in an EPU or an APU may be obtained.

SUMMARY OF THE INVENTION

It is the principal object of the invention to provide a new and improved stored energy system. More specifically, it is an object of the invention to provide both method and apparatus for achieving improved control over the flow of oxidant to a combustor in a stored energy system.

According to one facet of the invention, there is provided a turbine wheel adapted to rotate about an axis along with a nozzle in proximity to the turbine wheel for directing motive gases there against. A combustor is provided and has an outlet connected to the nozzle. Means are included for directing fuel into the combustor and there is further provided an oxidant storage vessel having an outlet. An oxidant flow line interconnects the storage vessel and the oxidant inlet and includes branches in fluid parallel with one another with one of the branches being constructed and arranged to provide substantially constant flow and the other of the branches being constructed and arranged to provide selectively variable flow.

In a preferred embodiment, a pressure controlling valve is located between the vessel outlet and the branches and preferably is a pressure regulator.

The invention contemplates the provision of a fluid flow control valve in the branch constructed and arranged to provide selectively variable flow. Through the use of the system, the entire "turn down" range of the valve is employed to vary only part of the flow of oxidant so as to enable finer and more precise control of the flow rate within the range of normal operating conditions.

The invention also contemplates the provision of a choked orifice in the constant flow branch and a venturi in the variable flow branch.

According to another facet of the invention, there is provided a method of controlling the production of motive gas for application to a gas turbine wheel which includes the steps of (a) supplying fuel to a combustor, and (b) simultaneously with the performance of step (a), supplying oxidant to the combustor via two parallel flow paths while holding flow in one of the paths essentially at a constant rate while controlling flow in the other of the paths to achieve the desired production of motive gas.

In a preferred embodiment, step (b) is performed utilizing a choked orifice in the one flow path and using a flow varying valve in the other flow path.

The invention contemplates performing step (b) such that the mass flow rate in the other path ranges from about 45% to about 500% of the mass flow in the one path, and preferably, during normal operation of the gas turbine wheel, the mass flow in the other path is at least twice the mass flow in the one path.

Other objects and advantages will become apparent from the following specification taken in conjunction with the accompanying drawing.

DESCRIPTION OF THE DRAWING

The Fig. is a schematic of a stored energy system made according to the invention.

DESCRIPTION OF THE PREFERRED EMBODIMENT

An exemplary embodiment of a stored energy system made according to the invention is illustrated in the drawing in the environment of an EPU. However, it should be understood that the invention is applicable to APUs as well.

With reference to the drawing, a gas turbine wheel 10 is seen to be mounted on a shaft 12 to be rotatable about the axis defined thereby The shaft 12 in turn is connected to a power unit 14 which may include an electrical generator, one or more hydraulic pumps, etc., which provide electrical or hydraulic energy for loads (not shown).

A nozzle is shown schematically at 16 in proximity to the turbine wheel 10 for directing motive gases against the same. The nozzle 16 is connected to the outlet 18 of a combustor, generally designated 20, to receive motive gases, including gases of combustion, therefrom.

The combustor includes a first fuel inlet 22 remote from the outlet 18 and a second fuel inlet 24 in proximity to the outlet 18 Also included is an oxidant inlet 26.

Fuel is provided to the inlets 22 and 24 from a fuel tank 28 as will be seen. The fuel tank 28 includes an internal bladder and a pressurizing inlet 32 connected to a source 34 of air under pressure via a control valve 36. When the valve 36 is opened, the bladder 32 will be pressurized to expel fuel from the tank 28 via an outlet 38. The fuel system also includes a relief valve 40 and a fill port 42 on the inlet side of the fuel tank 28.

The outlet 38 is connected to a vent cap 44 as well as a fill port 46 and a filter indicator 48. A fuel flow line 50 extends from the filter indicator to a primary fuel flow control servo valve 52 and to a secondary fuel flow control servo valve 54. The valve 52 is connected via a shut off valve 56 and an orifice 58 to the first inlet 22 while the valve 54 is connected via a shut off valve 60 to the second fuel inlet 24. As can be seen, the valves 58 and 60, when not establishing fluid communication from the valves 52 and 54 to the combustor 24 have connections to the source 34 which operate to purge the respective line to prevent residual fuel from gumming up the fuel lines over a period of time.

The fuel injected into the combustor 20 at the first inlet 22 is combusted with oxidant received at the inlet 26 to provide hot gases of combustion. Fuel injected into the combustor outlet 18 by the second inlet 24 does not appreciably participate in the combustion process, if at all. Rather, the same is vaporized and/or thermally cracked by the hot gases of combustion resulting from fuel introduced at the inlet 22 to increase the volume and mass flow of the motive gases being applied to the turbine wheel 10 by the nozzle 16.

The source 34 may also be connected to an air atomization valve 62 which in turn is connected to the first inlet 22 to provide for air atomization of fuel thereat and to a purge line 64 for directing a purging flow the combustor when fuel is not being flowed thereto. Also included is an ignitor 66.

The oxidant system includes a pressure vessel 70 which may be charged with an oxidant such as air, oxygen enriched air or even molecular oxygen in some instances. Charging is accomplished through a fill port 72 and fill valve 74. A pressure transducer 76 for monitoring the pressure of the charge of oxidant within the vessel 70 is also provided as is a pressure relief valve 78.

A line 80 extends from the outlet 82 of the vessel 70 to a shut-off valve 84. Downstream of the shut-off valve is a pressure regulator 86 which provides, when the shut-off valve 84 is opened, oxidant to a junction 88 at constant pressure.

The oxidant flow line branches at the junction 88 into a first branch 9 and a second branch 92. The branches 90 and 92 rejoin at a junction 94 which in turn is connected to the oxidant inlet 26.

The branch 90 is constructed and arranged so as to achieve a constant mass flow rate through the branch 90. This is achieved through the use of a choked orifice 96 within the branch 90. As is well-known, a choked orifice is sized so that flow through the same, for a given upstream pressure, will be constant regardless of variations in the downstream pressure.

The branch 92 includes an oxidant flow control servo valve 98 in series with a venturi 100. The venturi 100 also acts as a choked orifice but minimizes flow losses in the branch 92. A pressure transducer 102 and a temperature transducer 1 4 may also be connected to the branch 92 between the servo valve 98 and the venturi 100. The servo valve is operable to vary the flow through the branch 92 to achieve desired combustion conditions within the combustor 20 in response to signals received from a known servo control system 106. The signals are received on a line 108 and position feedback information is provided on a line 110.

Lines 112 and 114 respectively connect the temperature transducer 104 and pressure transducer 102 to the servo control and a line 116 connects a speed sensor 118 associated with the shaft 12 to the servo control. The valves 52 and 54 are respectively connected to the servo control 106 by means of lines 120 and 122. Thus, loading on the turbine wheel 10 may be determined by determining shaft speed sensed by the sensor 116 and information to that effect provided to the servo control to vary fuel flow through the valves 52 and 54 as well as oxidant flow through the valve 98 as appropriate. Pressure variations as well as the effect on varying temperature on mass flow rate may be determined through use of the transducers 102 and 104 to provide suitable control information.

In one system made according to the invention, the components were sided to provide 0.056 pounds per second of oxidant through the branch 90 while varying the oxidant flow through the branch 92 from 0.026 up to 0.28 pounds per second. The very low flow rates through the branch 92 are used only during minimum load operation. During normal operation, more typical flow rates through the branch 92 would be in the range of 0.12 to 0.28 pounds per second. Thus, the flow rate in the branch 92 may vary from about 45% all the way up to 500% of the mass flow through the branch 90 over the entire range of conditions while, in normal operating conditions, the flow through the branch 92 would be at least twice the flow through the branch 90.

The invention enables the use of a smaller valve 98 than would be required if all flow were passed through the same. Thus, the cost and weight may be reduced.

More importantly, because the full turn down value of the valve 98 is employed only on part of the oxidant flow, the total oxidant flow may be regulated with greater precision within the flow rate range for the branch 92. This not only enhances the combustion process, but improves the ability to minimize oxidant storage requirements.

In some instances, it might be desirable to provide in the line 90 some sort of means of compensating for temperature differences to assure constant mass flow irrespective of the temperature of the oxidant flowing therethrough. However, where oxidant flow through the branch 92 is substantially greater than that through the branch 90 as in the foregoing specific example, the effect of temperature variation on flow through the branch 90 is insignificant, thereby allowing one to dispense with any need for temperature compensation in flow through the branch 90.

I claim:

1. A stored energy system for providing hot gases to drive a turbine wheel comprising:
   a turbine wheel adapted to rotate about an axis;
   a nozzle in proximity to said turbine wheel for directing motive gases thereagainst;
   a combustor having an outlet connected to said nozzle;
   means for directing fuel into said combustor;

an oxidant storage vessel having an outlet;

a pressure controlling valve on said vessel outlet;

an oxidant inlet to said combustor;

a first fluid flow path, including a choked orifice, extending from said pressure controlling valve to said oxidant inlet; and a second fluid flow path including a fluid flow control valve extending from said pressure controlling valve to said oxidant inlet 2. The stored energy system of claim 1 wherein said second fluid flow path includes a venturi.

3. The stored energy system of claim 1 wherein said combustor has first and second fuel inlets, one remote from said combustor outlet and the other in proximity to said combustor outlet.

4. A stored energy system for providing hot gases to drive a turbine wheel comprising:

a turbine wheel adapted to rotate about an axis;

a nozzle in proximity to said turbine wheel for directing motive gases thereagainst;

a combustor having an outlet connected to said nozzle;

means for directing fuel into said combustor;

an oxidant storage vessel having an outlet;

an oxidant inlet to said combustor; and an oxidant flow line interconnecting said storage vessel and said oxidant inlet, said flow line including branches in fluid parallel with one of the branches being constructed and arranged to provide substantially constant flow and another of said branches being constructed and arranged to provide selectively variable flow.

5. The stored energy system of claim 4 further including a pressure regulator in said flow line and located between storage vessel and said one branch.

* * * * *